United States Patent
Rosen et al.

(10) Patent No.: US 7,277,395 B2
(45) Date of Patent: Oct. 2, 2007

(54) METHOD AND APPARATUS FOR WIRELESS NETWORK LOAD EMULATION

(75) Inventors: Derek Rosen, Santa Barbara, CA (US); Barry Solomon, Santa Barbara, CA (US)

(73) Assignee: IXIA, Calabasas, CA (US)

( * ) Notice: Subject to any disclaimer, the term of this patent is extended or adjusted under 35 U.S.C. 154(b) by 1000 days.

(21) Appl. No.: 10/424,161

(22) Filed: Apr. 25, 2003

(65) Prior Publication Data

US 2004/0214564 A1    Oct. 28, 2004

Related U.S. Application Data

(60) Provisional application No. 60/376,174, filed on Apr. 25, 2002.

(51) Int. Cl.
*H04J 1/16* (2006.01)
(52) U.S. Cl. ........................... 370/241; 370/252
(58) Field of Classification Search ............. 370/241, 370/242, 252, 247, 401, 402
See application file for complete search history.

(56) References Cited

U.S. PATENT DOCUMENTS

| | | | |
|---|---|---|---|
| 6,161,010 A * | 12/2000 | Oguri | ............... 455/423 |
| 6,189,031 B1 | 2/2001 | Badger | |
| 6,272,450 B1 | 8/2001 | Hill | |
| 6,308,065 B1 * | 10/2001 | Molinari et al. | ............. 455/424 |
| 6,601,020 B1 | 7/2003 | Myers | |
| 6,724,730 B1 | 4/2004 | Mlinarsky | |
| 2002/0138226 A1 | 9/2002 | Doane | |
| 2003/0009544 A1 | 1/2003 | Wach | |
| 2003/0069010 A1 * | 4/2003 | Eravelli | ............. 455/423 |
| 2003/0139919 A1 | 7/2003 | Sher | |
| 2003/0202486 A1 | 10/2003 | Anton | |
| 2003/0236089 A1 | 12/2003 | Beyme | |
| 2005/0053008 A1 | 3/2005 | Griesing | |

OTHER PUBLICATIONS

U.S. Appl. No. 10/776,413, Mlinarsky.

* cited by examiner

*Primary Examiner*—Brenda Pham
(74) *Attorney, Agent, or Firm*—SoCal IP Law Group LLP; Steven C. Sereboff; Mark Andrew Goldstein

(57) ABSTRACT

A method and system for emulating a user population for wireless local area network access point performance, optimization and configuration testing. The number of stations, data volume and related variables are programmed by a command and control computer, with a load emulator then offering a realistic station population and data traffic load to the wireless access point under test. Multiple load emulators may be deployed for the emulation and testing of very large networks.

6 Claims, 2 Drawing Sheets

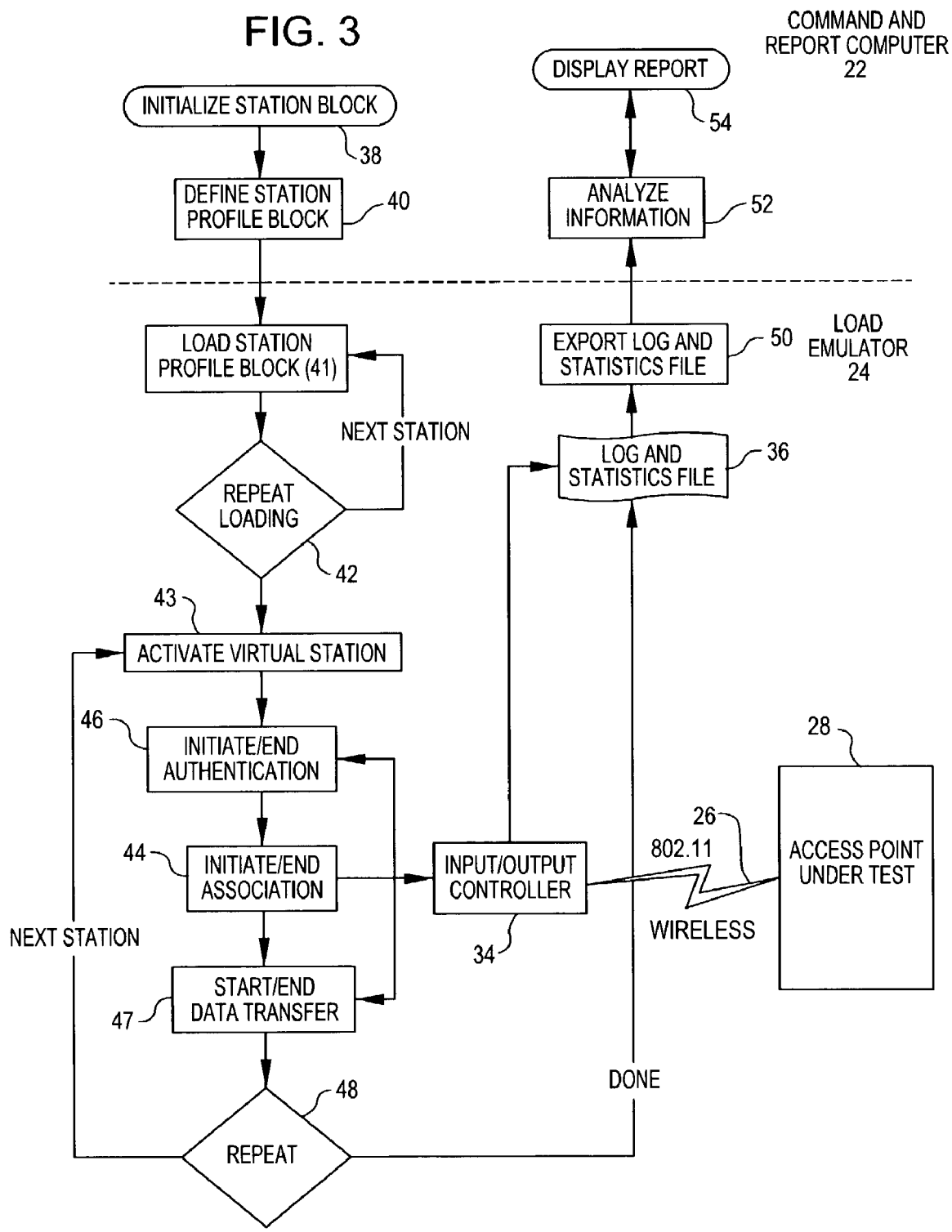

METHOD AND APPARATUS FOR WIRELESS NETWORK LOAD EMULATION

CROSS REFERENCE TO A RELATED APPLICATION

This application is entitled to, and claims the benefit of, provisional application No. 60/376,174 filed 25 Apr. 2002.

TECHNICAL FIELD OF THE INVENTION

The present invention relates generally to the field of data communications, and, more specifically, to the performance, optimization, and configuration testing of wireless local area network access points.

BACKGROUND OF THE INVENTION

Many, including development engineers, network administrators, and network testing organizations, have occasion to test the performance of wireless local area networks. The accepted practice of testing wireless local area networks is to install numerous computers with wireless network capability, then associate, authenticate, and present requests for data to a wireless hardware device called an access point, sending and receiving data streams over a high frequency radio channel. This common practice is expensive, driven by the cost of the many computers, and is not easily configurable for the commonly needed variety of user population sizes and data traffic loads.

SUMMARY OF THE INVENTION

The present invention, employing what is termed a load emulator, overcomes the considerable expense and inadequacies of the accepted practice of testing wireless local networks by emulating a programmable number of virtual stations, associating each virtual station with the access point, authenticating the user for security purposes, and transferring data designed to elicit performance parameters over a wireless link.

The load emulator method and apparatus (or system) has many advantages over the accepted practice, providing variable and realistic network load conditions, allowing network builders to quickly determine the efficiency and capacity of an access point under test.

Three components make up the load emulator test environment, 1) a computer to command test parameters and display results, 2) the load emulator, and 3) the wireless access point under test. With this configuration one can emulate from 1 to 255 virtual stations with realistic network addresses, network association procedures, user authentication processes, and transfer of data over the wireless network.

From this test procedure, a variety of information is collected, analyzed and displayed. One can use this information to analyze the access point under test, make configuration adjustments to optimize overall performance, determine access point capacity, establish boundaries of the target user population size, conduct performance comparisons of network equipment manufacturers, and acquire other useful data and information.

The objects, features, and advantages of the present invention will be apparent to the reader from the foregoing and the appended claims and as the ensuing detailed description and discussion proceeds in conjunction with the accompanying drawings.

BRIEF DESCRIPTION OF THE DRAWINGS

FIG. 3 is a flow diagram illustrating the operations of the load emulator functional elements along with load emulator command and report computer interaction.

DETAILED DESCRIPTION OF THE INVENTION

Figure 1:
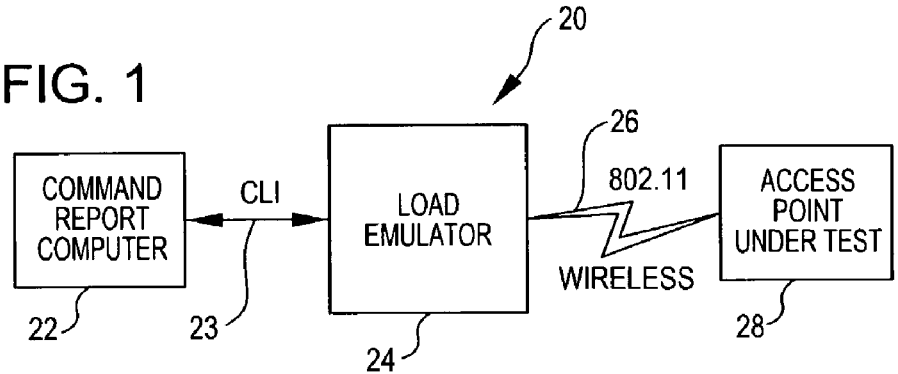
FIG. 1 is a block diagram illustrating a typical test environment embodying the principles of the present invention and comprising a load, emulator as disclosed herein connected to a command and report computer and to a wireless access point under test.

Referring now the drawings, a representative wireless access point test environment embodying the principles of the present invention and utilizing a load emulator is depicted in FIG. 1 and identified by reference character 20. In this system command and report computer 22 is connected by a serial wired connection 23 called a command line interface (CLI) to a load emulator 24 also encompassing those principles. The load emulator is connected over a wireless radio link 26 conforming to the 802.11 standard to an access point 24 under test. The access point is typically, but not necessarily, wired into a traditional enterprise data network 28.

Figure 2:
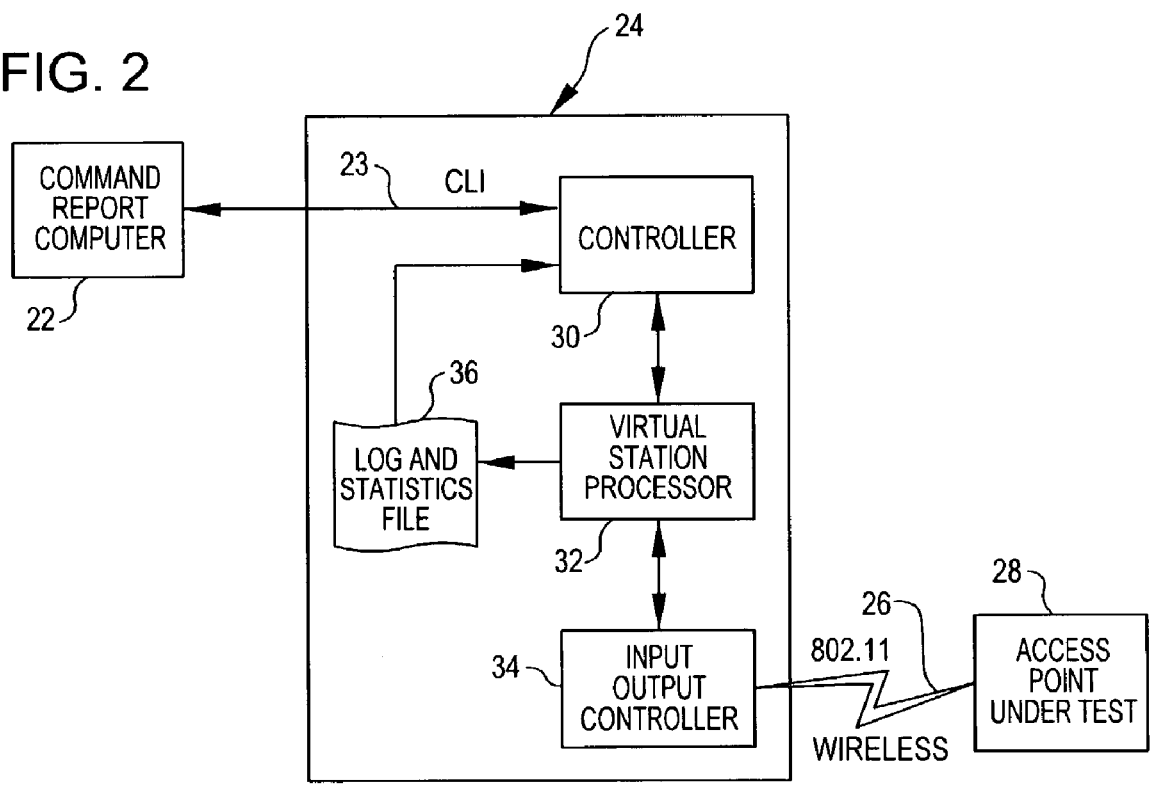
FIG. 2 is a block diagram illustrating the internal functional elements of the load emulator and the connections of the load emulator to the command and report computer and to the access point under test.

The functional elements of the novel and representative load emulator 24 are depicted in FIG. 2. These are: a controller 30 for command/report computer 22, a virtual station processor 32, access point input/output controller 34, and a log and statistics file 36.

System 20 is readied by initializing load emulator 24. To initialize the load emulator, a body of virtual station parameters is entered into command and report computer 22 either manually, or from a table of parameters stored in that computer. This station profile block of information contains a media access control (MAC) address, Internet protocol (IP) address, a station name and password, and packetized data for the transmission to the access points being tested. The MAC and IP addresses are specified over a range which accommodates the desired number of virtual stations. Packet sizes are specified over an allowable range, and are unique for each virtual station, thus realistically emulating a typical station population.

The virtual station processor 32 is responsible for execution of the test scripts 34, performing initial access point authentication through the input/output controller 34, the calculation of elapsed time, the recording of success or failure conditions, and the logging of the information into the log and statistics file 36. With successful authentication based on a virtual station name and password, the virtual station processor 32 initiates an association procedure 44 through the input/output controller 34. The input/output controller communicates directly with the access point 28 under test over 802.11 wireless link 26. Virtual station association elapsed time is calculated, success or failure recorded and resulting information loaded into log and statistics file 36. With successful authentication and association processes completed, virtual station processor 32 transfers a packet of realistic data to the input/output controller 34 for transmission over the wireless 802.11 link 26 to the access point 38 under test. Elapsed time and throughput of the data transfer is calculated with resulting data being stored in the log and statistics file 36.

This process is repeated in sequence for each virtual station until completion of the test run. At the conclusion of the test run controller 30 causes test data to be exported from log and statistics file 36 to command and report computer 22 for analysis of the recorded data and display of test results.

FIG. 3 depicts internal operations of the load simulator 24, beginning with station block initialization process 38 and station profile block definition process 40 by the external command and report computer 22. In load emulator 24 the station profile block 41 is loaded with a MAC address, an IP address, and packetized data for transmission. A repeat loading process 42 tracks the number of virtual stations to be tested and determines when the last station has been emulated. Once all virtual station profile blocks have been loaded, active virtual station process 44 is enabled. A virtual station name and password are passed to input/output controller 34 and presented to the access point 28 under test for authentication of the particular virtual station. Elapsed time and success or failure of the virtual station authentication is stored in log and statistics file 36. Upon successful authentication virtual station association is attempted by the initiate/end association process 46. Elapsed time and success or failure of the virtual station association is stored in log and statistics file 36.

With successful authentication and association of the virtual station, a programmable sized packet of data is transferred to the input/output controller 34 for transmission over the 802.11 wireless link 26 to the access point 28 being tested (process 47). Elapsed time of the data transfer is calculated, error conditions reported and data throughput recorded in log and statistics file 36.

A second repeat process 48 sequentially processes all virtual stations, one after the other, by triggering activate virtual station process 43 until the last virtual station has been emulated. Upon completion of the test run, the repeat loading process 48 signals completion to log and statistics file 36. The log and statistics file information is then transferred by export log file process 50 across CLI 23 to the command and report computer 22, which analyzes the information (process 52), and displays the results (process 54).

The invention may be embodied in many forms in addition to those disclosed herein without departing from the spirit or essential characteristics of the invention. The present embodiments are therefore to be considered in all respects as illustrative and not restrictive, the scope of the invention being indicated by the appended claims rather than by the foregoing description. All changes which come within the meaning and range of equivalency of the claims are intended to be embraced therein.

What is claimed is:

1. A method of evaluating a network access point, the method comprising:
   creating a virtual station for the network access point, including creating a different virtual station for each of a number of network access points;
   transmitting performance evaluation data from the virtual station to the network access point, including sending a block of performance association data from at least some of the virtual stations to associated network access points to evaluate performance of the network access points;
   receiving a communication from the network access point in response to the performance evaluation data;
   calculating network access point performance data based on the response received from the network access point, wherein the network access point performance data is stored in a log and statistics file;
   exporting the log and statistics file to a computer for analysis.

2. The method of claim 1 further comprising:
   authenticating and associating the virtual station with the network access point before the transmitting.

3. The method of claim 1 wherein the transmitting is achieved via an input/output controller.

4. The method of claim 3 wherein the transmitting is achieved via a wireless connection between the input/output controller and the network access point.

5. A load emulator to evaluate a network access point, the load emulator comprising:
   a virtual station which comprises a station profile and is associated with the network access point;
   a command and report computer;
   a first controller associated with the computer and the virtual station to control the transfer of commands and data between the computer and the virtual station;
   a communications link between the virtual station and the network access point;
   a second controller to control the communications link; and
   a log and statistics file to store calculated test results based on data sent to and received from the access point.

6. A method for evaluating a network by testing multiple network access points, the method comprising:
   loading station profiles seriatim into each of multiple virtual station processors corresponding on a one-to-one basis with the network access points;
   activating the virtual station processors in turn to:
      (a) authenticate the virtual station processor,
      (b) associate the authenticated virtual station processor with the corresponding network access and point,
      (c) initiate the transfer of access point evaluation data from the associated virtual station processor to the corresponding network access point;
   calculating test result data based on data sent to and received from each access point that is successfully associated with each corresponding virtual station processor;
   analyzing the test result data;
   storing the test result data in a log and statistics file;
   displaying the results of the analysis.

* * * * *